United States Patent
Slaton et al.

(10) Patent No.: US 9,387,856 B2
(45) Date of Patent: Jul. 12, 2016

(54) POINT-OF-SALE VEHICLE PARAMETER CONFIGURATION

(71) Applicants: Zachary Slaton, Seattle, WA (US); Jason Potter, Maple Valley, WA (US); Erin Luke, Sanger, TX (US); Cindi Vangel, Bellevue, WA (US)

(72) Inventors: Zachary Slaton, Seattle, WA (US); Jason Potter, Maple Valley, WA (US); Erin Luke, Sanger, TX (US); Cindi Vangel, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 7 days.

(21) Appl. No.: 14/283,203

(22) Filed: May 20, 2014

(65) Prior Publication Data

US 2015/0336581 A1 Nov. 26, 2015

(51) Int. Cl.
*B60T 8/32* (2006.01)
*B60W 30/14* (2006.01)

(52) U.S. Cl.
CPC ............. *B60W 30/146* (2013.01); *B60W 30/14* (2013.01)

(58) Field of Classification Search
CPC .... G01C 21/36; B60R 25/00; B60R 25/2081; B60R 25/241; B60R 16/037; G06Q 10/02
USPC ...................... 701/1, 36, 45, 49; 307/9.1, 10.1
See application file for complete search history.

(56) References Cited

U.S. PATENT DOCUMENTS

| | | | |
|---|---|---|---|
| 6,041,310 A | 3/2000 | Green | |
| 6,430,488 B1 | 8/2002 | Goldman | |
| 6,922,674 B1 | 7/2005 | Nelson | |
| 7,353,192 B1 | 4/2008 | Ellis | |
| 2002/0065707 A1 | 5/2002 | Lancaster | |
| 2010/0138246 A1* | 6/2010 | Carey | G06Q 10/02 705/5 |
| 2011/0022545 A1 | 1/2011 | Durney | |
| 2011/0137758 A1 | 6/2011 | Bienias | |
| 2012/0294257 A1* | 11/2012 | Zhang et al. | 370/329 |
| 2013/0132227 A1 | 5/2013 | Bienias | |
| 2014/0064213 A1* | 3/2014 | Guo et al. | 370/329 |
| 2014/0309868 A1* | 10/2014 | Ricci | H04W 48/04 701/36 |
| 2014/0309892 A1* | 10/2014 | Ricci | 701/49 |

OTHER PUBLICATIONS

"Build My ProStar+," ©2013 Navistar, Inc., <http://www.internationaltrucks.com/trucks/configurator> [retrieved Sep. 4, 2013], 2 pages.
"Build Your Toyota," <http://www.toyota.com/configurator/> [retrieved Sep. 4, 2013], 2 pages.

\* cited by examiner

*Primary Examiner* — Gertrude Arthur Jeanglaud
(74) *Attorney, Agent, or Firm* — Christensen O'Connor Johnson Kindness PLLC

(57) ABSTRACT

A computing device (e.g., a server computer hosted by a vehicle manufacturer or retailer) receives vehicle configuration information obtained via a user interface of a user device. The vehicle configuration information includes one or more user-adjustable settings. The computing device determines whether a conflict exists between the user-adjustable settings and a regulated vehicle parameter (e.g., a vehicle speed limit), which may be associated with greenhouse gas emissions of the vehicle. The computing device transmits feedback information to the user device. The feedback information may include a description of one or more conflicts between the user-adjustable settings and the regulated vehicle parameter, recommended adjustments to the settings, or the like. The recommended adjustments to the settings may, if accepted by a user, improve regulatory compliance for the vehicle, and may remove or reduce the degree of conflicts between the user-adjustable setting and the regulated vehicle parameter.

27 Claims, 13 Drawing Sheets

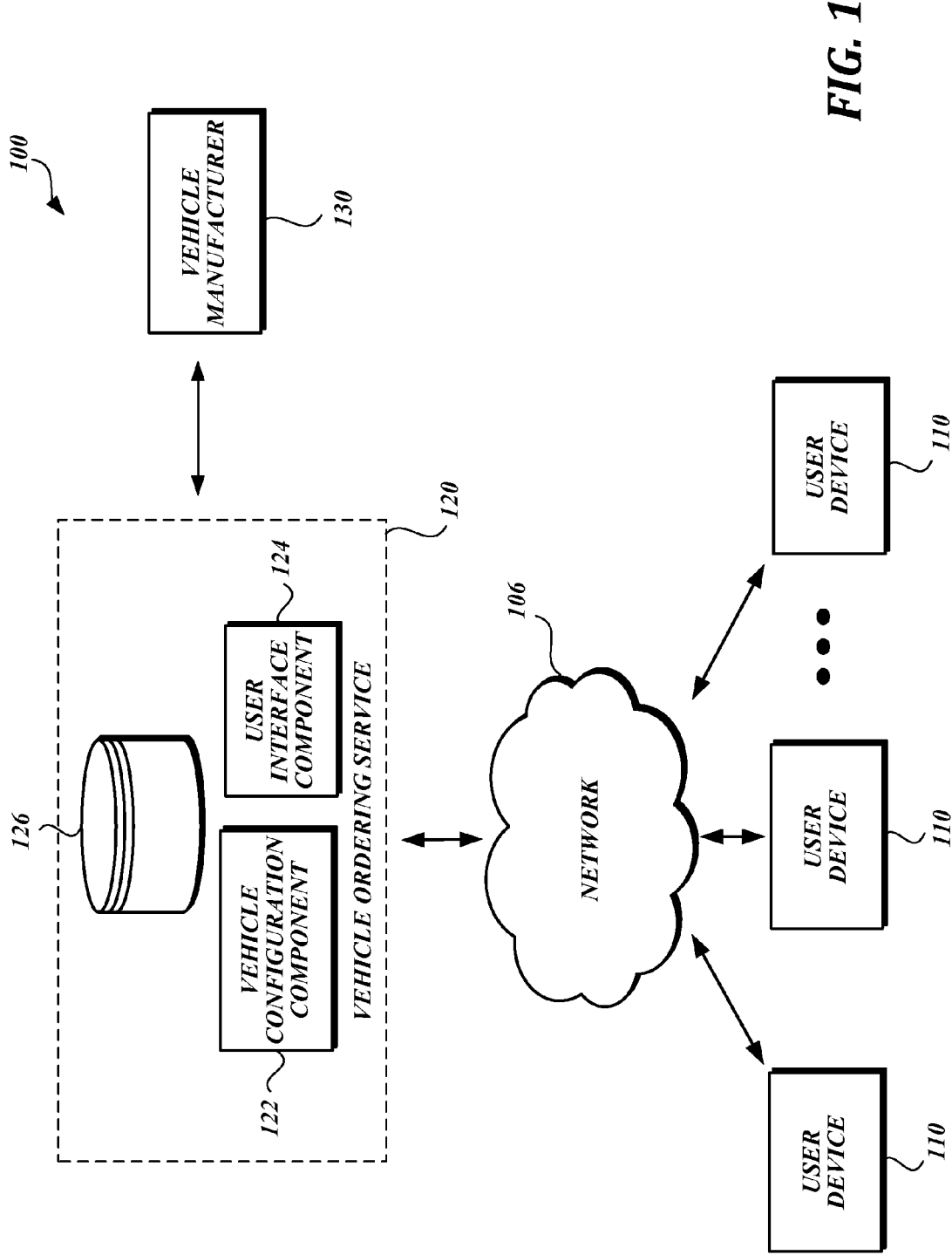

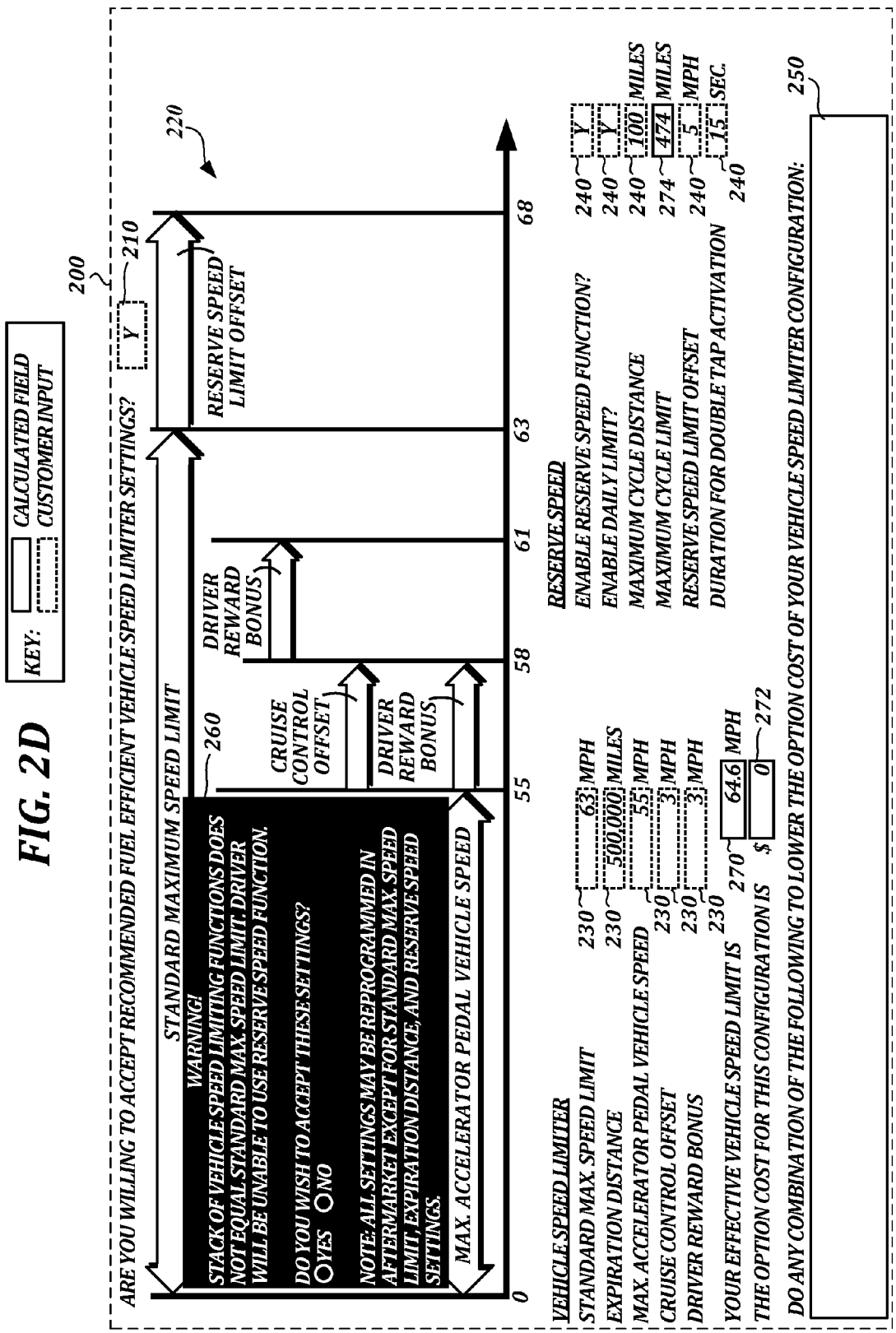

POINT-OF-SALE VEHICLE PARAMETER CONFIGURATION

BACKGROUND

Web sites that allow a user to select a desired configuration for a product before purchasing the product have become increasingly popular. For example, when shopping for or purchasing a vehicle, a user can select a specific model, color, interior and exterior options, and the like. In some cases, the selected options (e.g., powertrain options or options that affect aerodynamics) can affect the cost, fuel efficiency, or performance of the vehicle. Updated information can be provided to a user after particular options have been selected, and users may be given the opportunity to change or confirm the selected options before placing an order.

However, existing tools are not adapted for more fine-tuned configuration goals, such as regulatory compliance. Users typically must rely on their own knowledge and judgment to select appropriate vehicle configuration options for regulatory compliance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a computer-implemented method described herein, a computing device (e.g., a server computer hosted by a vehicle manufacturer or retailer) receives vehicle configuration information obtained via a user interface of a user device. The vehicle configuration information includes a user-adjustable setting for an unconstrained vehicle parameter. The computing device determines whether a conflict exists between the user-adjustable setting for the unconstrained vehicle parameter and a regulated vehicle parameter. The regulated vehicle parameter (e.g., a vehicle speed limit) may be associated with greenhouse gas emissions of the vehicle. The computing device transmits feedback information to the user device. The feedback information is based at least in part on whether the conflict exists. The feedback information may include a description of one or more conflicts between the user-adjustable setting for the unconstrained vehicle parameter and the regulated vehicle parameter, suggested settings to reduce cost, or the like. The suggested settings to reduce cost may, if accepted by a user, improve regulatory compliance for the vehicle, and may remove or reduce the degree of one or more conflicts between the user-adjustable setting for the unconstrained vehicle parameter and the regulated vehicle parameter.

The vehicle configuration information also may include a user-adjustable setting for the regulated vehicle parameter, an indication of whether the vehicle is in a regulated category, or an indication of whether regulatory constraints of vehicle parameters are accepted by a user. The method may further include receiving updated vehicle configuration information, including an updated user-adjustable setting for the unconstrained vehicle parameter or processing an order for the vehicle based on the vehicle configuration information.

In another computer-implemented method described herein, a first computing device presents a user interface to a user. The user interface is configured to receive user input that includes a user-adjustable setting for an unconstrained vehicle parameter. The first computing device transmits the user-adjustable setting for the unconstrained parameter to a remote computing device. The first computing device receives feedback information from the remote computing device. The feedback information includes an indication of whether a conflict exists between the user-adjustable setting for the unconstrained vehicle parameter and a regulated vehicle parameter (e.g., a vehicle speed limit). The first computing device presents the feedback information via the user interface. The user interface may be further configured to obtain a user-adjustable setting for the regulated vehicle parameter, which may be constrained. The feedback information may further include cost information or a reconfiguration prompt. The method may further include transmitting an updated user-adjustable setting for the unconstrained vehicle parameter.

In another computer-implemented method described herein, a computing device presents a user interface configured to receive user input associated with a configuration of a regulated vehicle. The computing device receives user preference information via the user interface. The user preference information includes an indication of a user's acceptance or nonacceptance of regulation-based constraints on vehicle parameters. The computing device presents feedback information via the user interface. The feedback information includes cost information and a reconfiguration prompt that are based at least in part on the user preference information. The method may further include identifying a conflict with a regulated vehicle parameter (e.g., a vehicle speed limit).

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram of a system architecture that includes components suitable for implementing aspects of the disclosed subject matter;

FIGS. 2A-2F are diagrams that depict features of an illustrative graphical user interface in accordance with aspects of the disclosed subject matter;

DETAILED DESCRIPTION

Figure 2A:
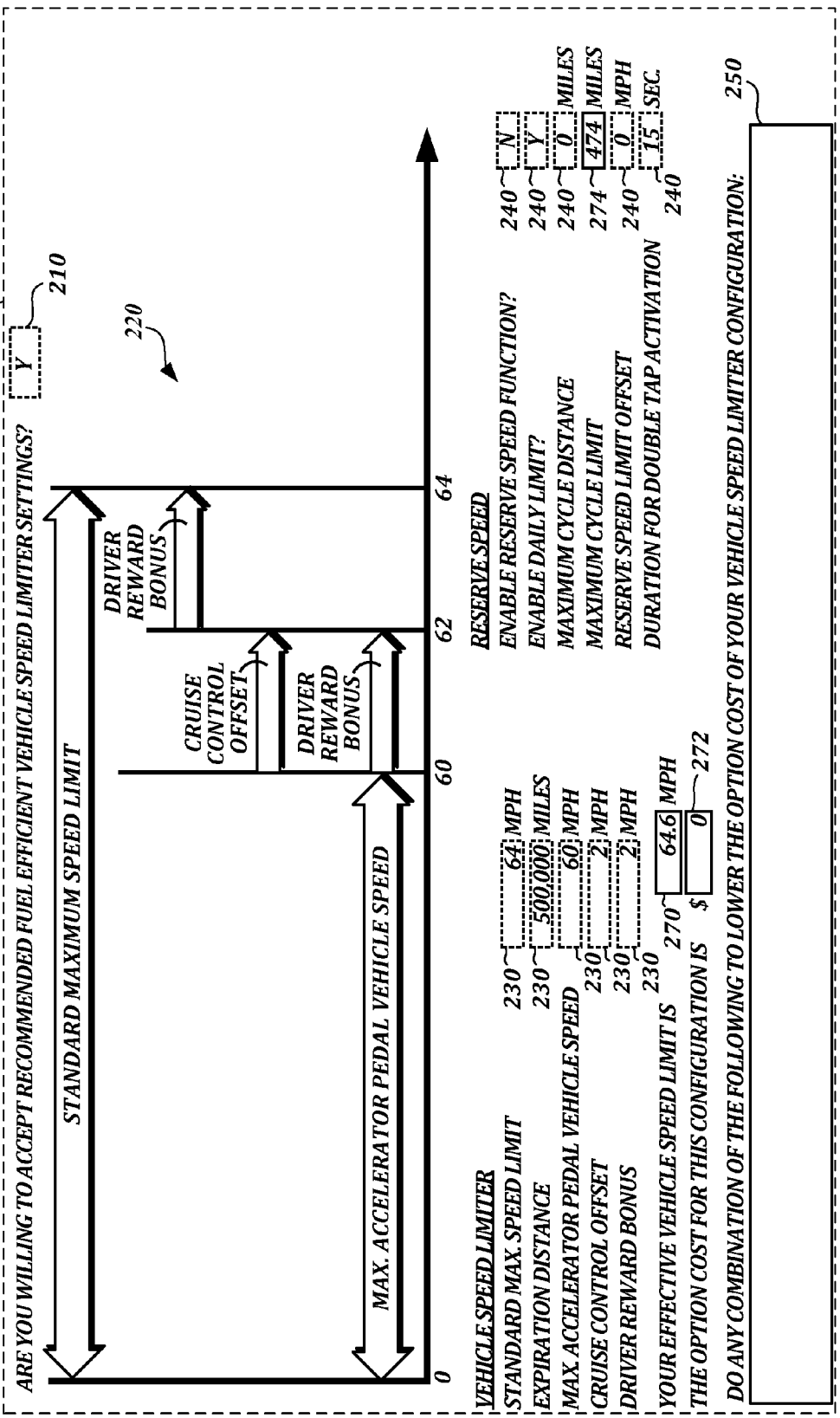

Embodiments of the present disclosure are generally directed to techniques and tools for vehicle parameter configuration (e.g., at the point of sale, such as a purchase of a vehicle over the Internet). Described techniques and tools are able to effectively handle challenges posed by vehicle regulation, e.g., by detecting conflicts between regulated parameters and unregulated parameters. The existence of conflicts may lead to undesirable outcomes such as decreased fuel efficiency, increased cost of the vehicle, or the like. Described techniques and tools are useful for providing feedback to guide users to improve fuel efficiency or performance, reduce vehicle cost, or other potential benefits. For example, if an effective vehicle speed limit (VSL) is mandated by a greenhouse gas (GHG) emission regulation, a user can be notified if a particular combination of settings (e.g., "driver reward" speed bonuses, reserve speed functionality, cruise control offsets, or the like) may lead to a conflict with constraints on the effective VSL. The user can be provided with an opportunity to adjust settings to avoid surcharges or other undesirable outcomes.

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

FIG. 1 is a block diagram of a system architecture that includes components suitable for implementing aspects of the disclosed subject matter. In the example shown in FIG. 1, a system environment 100 includes a vehicle ordering service 120 and remote user devices 110 (e.g., laptop or desktop computers, smart phones, tablet computers, or the like) by which a user (not shown) can interact with the vehicle ordering service 120 in order to place an order for a vehicle. The vehicle ordering service 120 provides vehicle configuration and purchasing services for users. The user devices 110 communicate with the vehicle ordering service 120 via a network 106, such as the Internet.

The vehicle ordering service 120 may be implemented by one or more computing devices, such as server computers. In the example shown in FIG. 1, the vehicle ordering service 120 includes a data store 126, a vehicle configuration component 122, and a user interface component 124.

The data store 126 may include databases for storing information relevant to the functionality provided by the vehicle ordering service 120. For example, the data store 126 may store information such as available vehicle models, customizable attributes of such vehicles, and the like. As described in detail below, the data store also may include information such as regulatory information, vehicle parameter constraints, user preferences, and other information that may be relevant to vehicle configuration. As used herein, the term "vehicle" generally refers to any type of vehicle, such as a truck, automobile, boat, recreational vehicle ("RV"), or the like.

The user interface component 124 is configured to cause a user interface, such as a graphical user interface (GUI), to be presented on the user devices 110 to facilitate interaction with users. The user interface may be presented in any number of ways, such as via a Web browser, a dedicated application, or the like. The vehicle configuration component 122 processes user input and generates vehicle configuration information (e.g., as a data file). Vehicle configuration information can be repeatedly reviewed and modified (e.g., by a user), as described in detail below. Vehicle configuration information can be used for different purposes. For example, vehicle configuration information can be included in a purchase order for a vehicle and can be used to generate a build specification for a vehicle. The build specification can be sent to a vehicle manufacturer 130 for subsequent production of an appropriately configured vehicle.

FIGS. 2A-2F are diagrams of an illustrative GUI 200 that can be used to configure a vehicle in accordance with embodiments of the disclosed subject matter. In FIGS. 2A-2F, the vehicle being configured is a truck that is part of a regulated category. By identifying whether a particular model or chassis has regulated parameter settings, suitable constraints for vehicle parameters can be selected and applied in pre-sale configurations and in aftermarket reprogramming, if available. In the examples shown in FIGS. 2A-2F, the truck being configured is in a category that is subject to regulations relating to greenhouse gas (GHG) emissions. GHG-emission regulations may set limits on parameters, such as effective VSLs, to improve fuel efficiency of vehicle fleets and thereby reduce GHG emissions. In accordance with this illustrative regulated category, a user is prompted to accept or not accept "recommended fuel efficient vehicle speed limiter settings" in GUI element 210. In these examples, the prompt associated with GUI element 210 is directed to whether the user will accept constraints on settings that comply with GHG-emission regulations.

As will be understood, the regulated parameters and associated constraints described herein are only examples; they can be replaced or supplemented with other regulated parameters and constraints. For example, in addition to parameters relating to vehicle speed, engine idle parameters (e.g., engine idle timers that set a time limit for how long an idling engine may be allowed to run before shutting down) or other parameters that may affect GHG emissions may be regulated. As another example, if bridge laws or other regulations place restrictions on vehicle weight or weight distribution (e.g., by establishing a limit on a weight-to-length ratio of a vehicle crossing a bridge), constraints can be applied to parameters such as axle spacing, tires per axle, tire size, and the like for vehicles or axle groups on vehicles. As described in detail below, feedback can be presented to alert a user to a conflict between user-adjustable settings and regulated parameters, to illustrate how user-adjustable settings may interact with a regulated parameter (e.g., an effective VSL, an engine idle shutdown time period, etc.), to illustrate how a user can adjust settings to achieve desired results (e.g., reduced cost), or to provide other functionality or information.

Referring again to FIGS. 2A-2F, illustrative states of the GUI 200 are shown in which a user is able to provide input to indicate user preferences and adjust settings that may relate to a regulated parameter, such as an effective VSL. The VSL setting elements 230 can accept user input for settings such as a standard maximum speed limit, an expiration distance for the speed limit, a maximum accelerator pedal vehicle speed, and a cruise control offset and driver reward bonus that can be added to the maximum accelerator pedal vehicle speed. The reserve speed setting elements 240 can accept user input for settings such as enabling or disabling a reserve speed function, enabling or disabling a daily limit, a maximum cycle distance, a reserve speed limit offset, and options for activating reserve speed. In at least one embodiment, reserve speed is activated with a double-tap action on an accelerator pedal, which involves moving the pedal through two cycles in which a first actuation (e.g., 100% actuation) is followed by another actuation (e.g., 75% actuation) within a defined time period (e.g., 15 seconds). This combination of movements is distinguishable from a single tap that may be used to temporarily accelerate a truck.

Actions that may be available to reduce vehicle option costs incurred by the user-adjustable settings can be displayed in the cost-reduction feedback element 250. Calculated fields 270, 272, and 274 contain values that are calculated automatically, e.g., based on user preferences, user-adjustable settings, or default settings, as appropriate. For example, a vehicle option cost can be provided in calculated field 272 according to a pricing algorithm that sets vehicle option costs to encourage users to select more fuel efficient configurations. The pricing algorithm can be based on forecasts of what prices will cause users to select configurations to result in an effective VSL that meets a GHG regulation.

Calculated fields may be calculated based at least in part on regulatory requirements. See "Greenhouse Gas Emissions Standards and Fuel Efficiency Standards for Medium- and Heavy-Duty Engines and Vehicles; Final Rule," 76 FR 179, p. 57423 (Sep. 15, 2011). For example, the maximum cycle limit can be provided in calculated field 274 according to an algorithm that sets the maximum cycle limit for reserve speed based on whether the truck being configured includes a day cab (e.g., 252 miles/day) or a sleeper cab (e.g., 474 miles/day). As another example, the effective VSL can be provided in calculated field 270 according to the following equation:

$$\text{Effective VSL} = ExF*(STF*STSL+(1-STF)*DSL)+ (1-ExF)*(65\text{ mph}),$$

where ExF is a ratio of expiration point miles/1,259,000 miles, STF is a ratio of maximum number of allowable "soft top" operation miles per day/252 miles (day cab) or 474 miles (sleeper cab), STSL is the soft top speed limit, and DSL is the default speed limit. In this example, the DSL is equal to the standard maximum speed limit, and the STSL is equal to the DSL plus the reserve speed limit offset.

The various states of the graphical chart 220 in FIGS. 2A-2F provide examples of how user-adjustable settings can interact with regulated parameters and how such interactions can be presented to a user in order to guide user behavior. In the examples shown in FIGS. 2A-2F, the graphical chart 220 shows vehicle speed values along a horizontal axis. The standard maximum speed limit is represented as an arrow and is displayed along with additional arrows that represent user-adjustable settings that affect vehicle speed, such as the maximum accelerator pedal vehicle speed, cruise control offset, and driver reward bonus settings. A reserve speed limit offset, if enabled, can be represented as an additional arrow. (See FIGS. 2B and 2D.)

Referring to FIGS. 2A-2E, the GUI element 210 indicates that GHG-compliant settings have been accepted as a user preference for the vehicle being configured, meaning that at least some vehicle parameters are constrained. In these examples, the constrained parameter is the effective VSL, which has multiple constraints, e.g., a first constraint of 64.6 mph and a second constraint of 64.9 mph. If these constraints are exceeded due to user-adjustable settings, the user can proceed with these settings but may incur a VSL option cost.

Figure 2B:
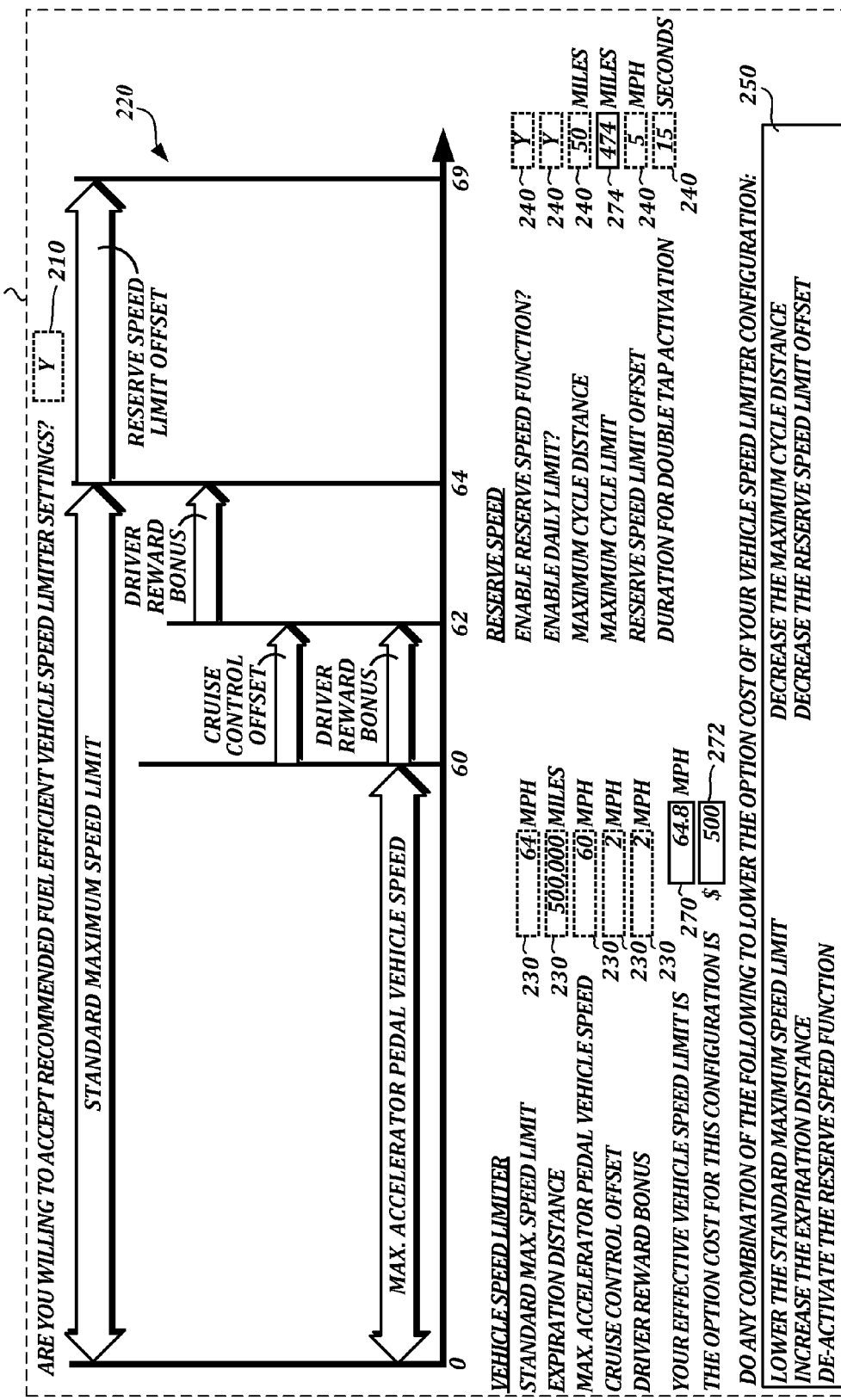
Figure 2C:
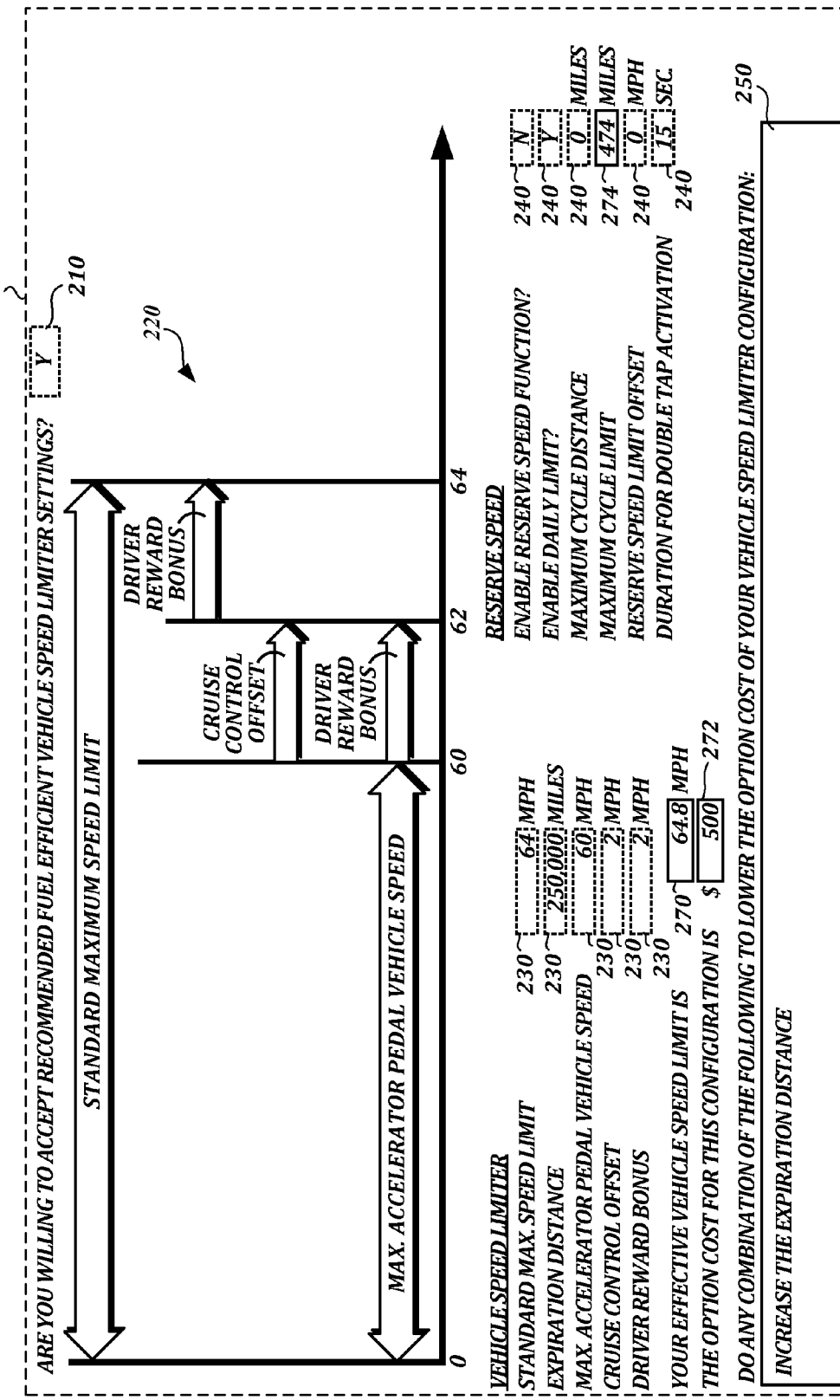
Figure 2E:
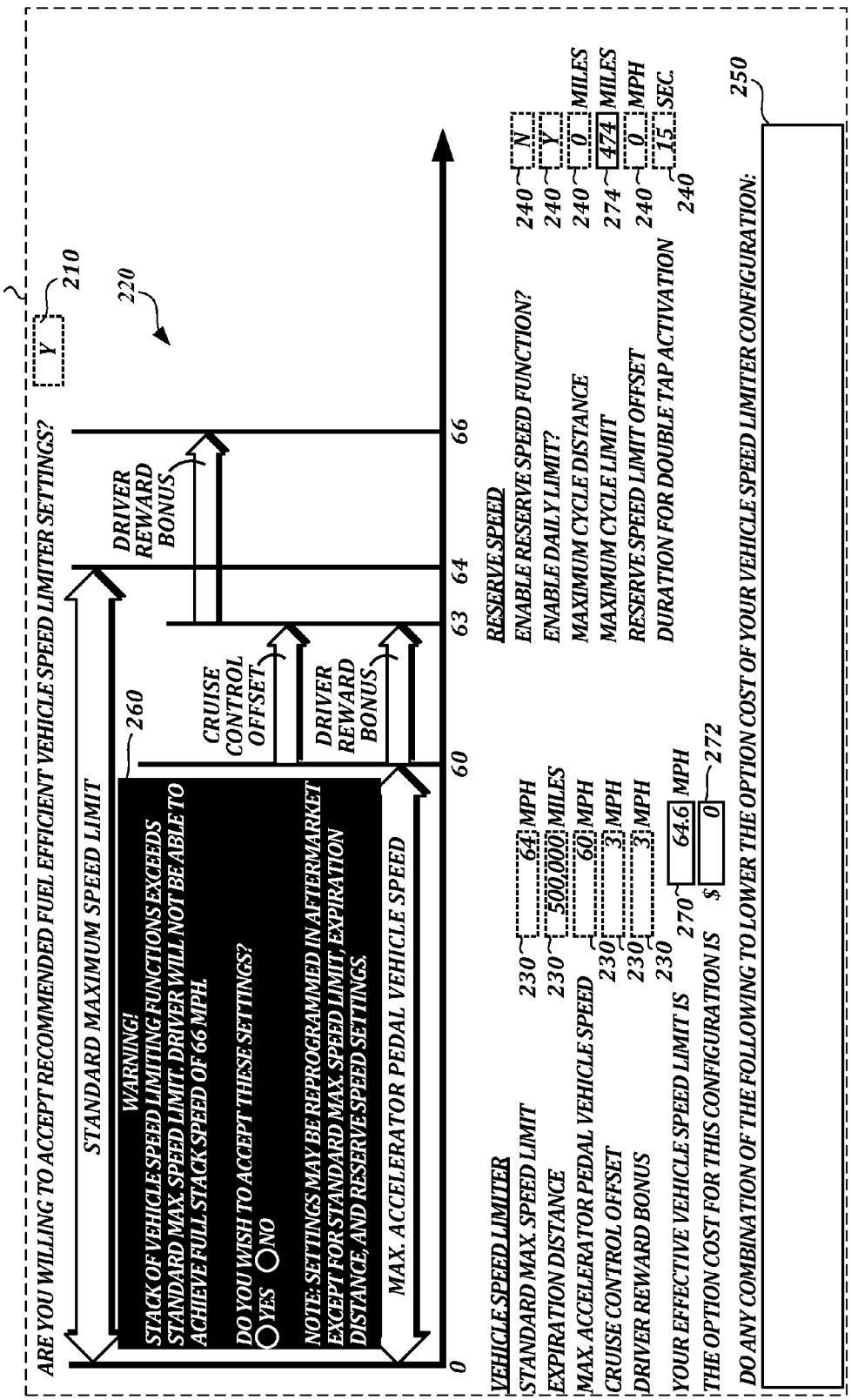
Figure 2F:
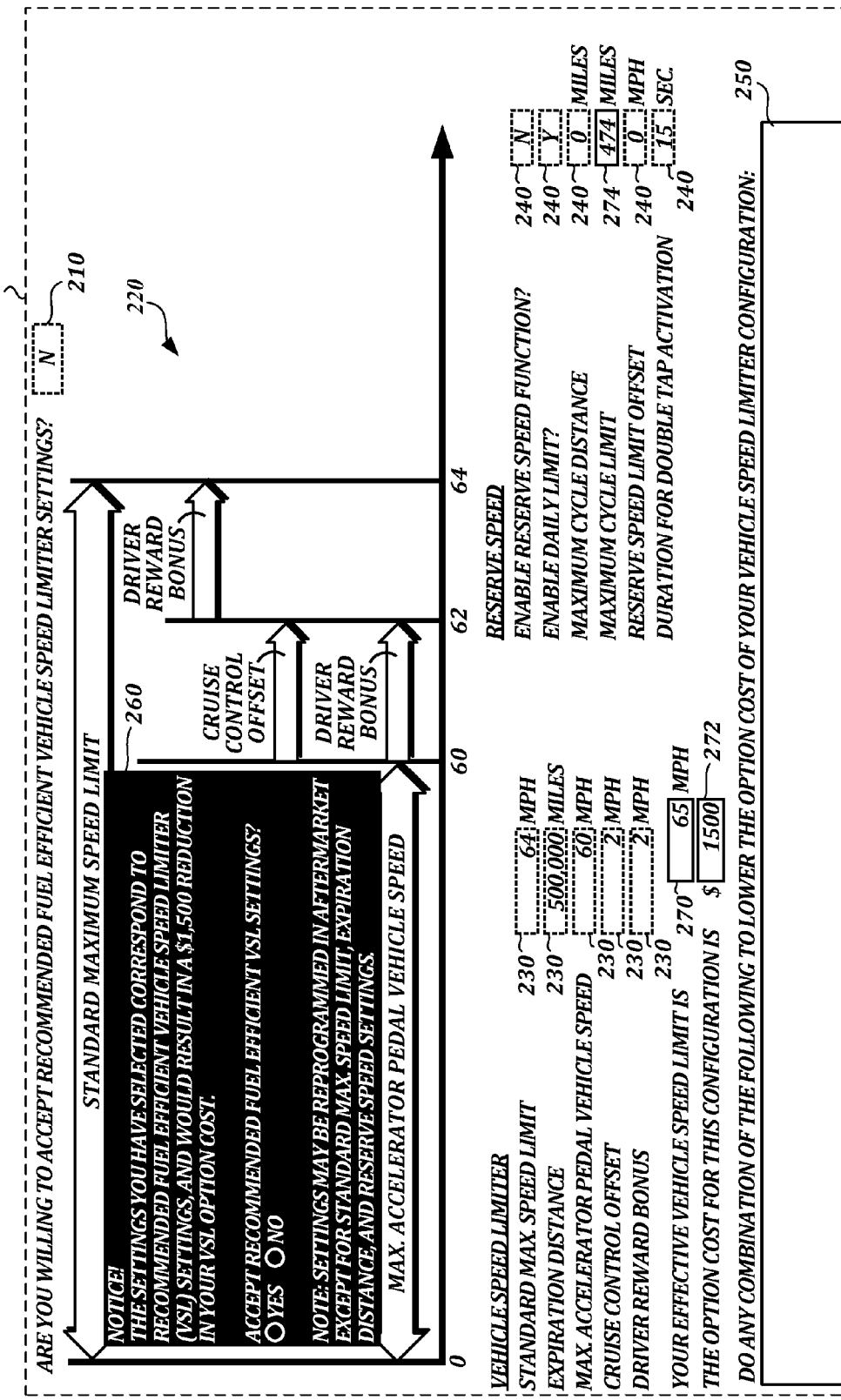

In FIGS. 2A, 2D, and 2E, the effective VSL of 64.6 mph does not exceed the constraints and results in no additional VSL option cost for the configuration. In FIGS. 2B and 2C, the effective VSL of 64.8 exceeds the first constraint and results in an additional VSL option cost (e.g., $500) for the configuration, as shown in the calculated fields 270 and 272, respectively. In FIG. 2F, the GUI element 210 indicates that GHG-compliant settings have not been accepted for the vehicle being configured, which results in a default value for the effective VSL of 65 that exceeds both constraints and leads to a higher vehicle option cost of $1,500. These vehicle option costs may reflect the fact that certain vehicle configurations (e.g., configurations that lead to higher effective VSL values) may be assigned higher costs in accordance with regulations (e.g., GHG-emission regulations). As will be understood, the particular constraints and results from constraints being exceeded that are used in these examples are only illustrative, and not limiting.

In FIGS. 2A-2F, user interface features such as the graphical chart 220, cost-reduction feedback element 250, graphical alerts 260, and calculated fields 270 and 272 can provide user feedback, e.g., to alert a user to a conflict between user-adjustable settings and a regulated parameter, to illustrate how user-adjustable settings may interact with a regulated parameter (e.g., the effective VSL), to indicate how a user can adjust settings to achieve desired results (e.g., to avoid a conflict with a regulated parameter to reduce cost), or to provide other functionality or information. In the examples shown in FIGS. 2B and 2C, user feedback includes an indication of an additional VSL option cost of $500 in the calculated field 272 and includes suggested actions to reduce the VSL option cost in the cost-reduction feedback element 250. In FIG. 2B, the suggested actions include reducing the standard maximum speed limit of 64 mph, increasing the expiration distance of 500,000 miles for the standard maximum speed limit, deactivating the reserve speed function, decreasing the maximum cycle distance of 50 miles for the reserve speed function, and decreasing the reserve speed limit offset of 5 mph. In FIG. 2C, the suggested actions include increasing the expiration distance of 250,000 miles. As will be understood, the particular actions that are suggested in these examples are only illustrative, and are not limiting. For example, the suggested actions in FIG. 2C also may include lowering the standard maximum speed limit, or other actions.

In the examples shown in FIGS. 2D-2F, a graphical alert 260 is used to provide additional user feedback to guide user behavior. The graphical alert 260 may be a pop-up window or other GUI feature suitable for presenting information and/or receiving user input. The graphical alert 260 may be displayed until dismissed by a user, until a user provides prompted input (e.g., selecting "yes" or "no"), until a predetermined period of time has elapsed, or some other event takes place.

In FIG. 2D, the graphical alert 260 indicates that the cumulative "stack speed" of the maximum accelerator pedal vehicle speed (55 mph), cruise control offset (3 mph), and driver reward bonus (3 mph) is less than the standard maximum speed limit (63 mph), which in this example means that the reserve speed function selected by the user will not be available to the vehicle operator. The graphical alert 260 prompts the user to select "yes" or "no" to indicate whether to accept these settings in view of the unavailability of the reserve speed function.

In FIG. 2E, the graphical alert 260 indicates that the cumulative stack speed (66 mph) is greater than the standard maximum speed limit (64 mph), which in this example means that the full stack speed of 66 mph will not be available to the vehicle operator. The graphical alert 260 prompts the user to select "yes" or "no" to indicate whether to accept these settings in view of the unavailability of the full stack speed.

In FIGS. 2D and 2E, the graphical alert 260 also indicates that at least some settings may be changed in aftermarket reprogramming, namely, settings other than the standard maximum speed limit, expiration distance, and reserve speed settings. Alternatively, more settings, fewer settings, or other type of settings may be changed in aftermarket reprogramming.

In FIG. 2F, the graphical alert 260 indicates that the illustrated user-adjustable settings are already within the constraints for GHG-compliant settings and that if the user accepts GHG-compliant settings, the vehicle option cost can be reduced to zero without changing other settings. The graphical alert 260 prompts the user to select "yes" or "no" to indicate whether to accept the recommended fuel efficient VSL settings in view of the potential cost savings. The graphical alert 260 also indicates that if the recommended settings are accepted, some settings (e.g., standard maximum speed limit, expiration distance, and reserve speed settings) may be fixed in some situations (e.g., some values may not be changed in aftermarket modifications).

If a current configuration is satisfactory to the user, the user can finalize and submit the configuration, e.g., by activating a "submit" button (not shown) or other suitable user interface element.

Figure 3:
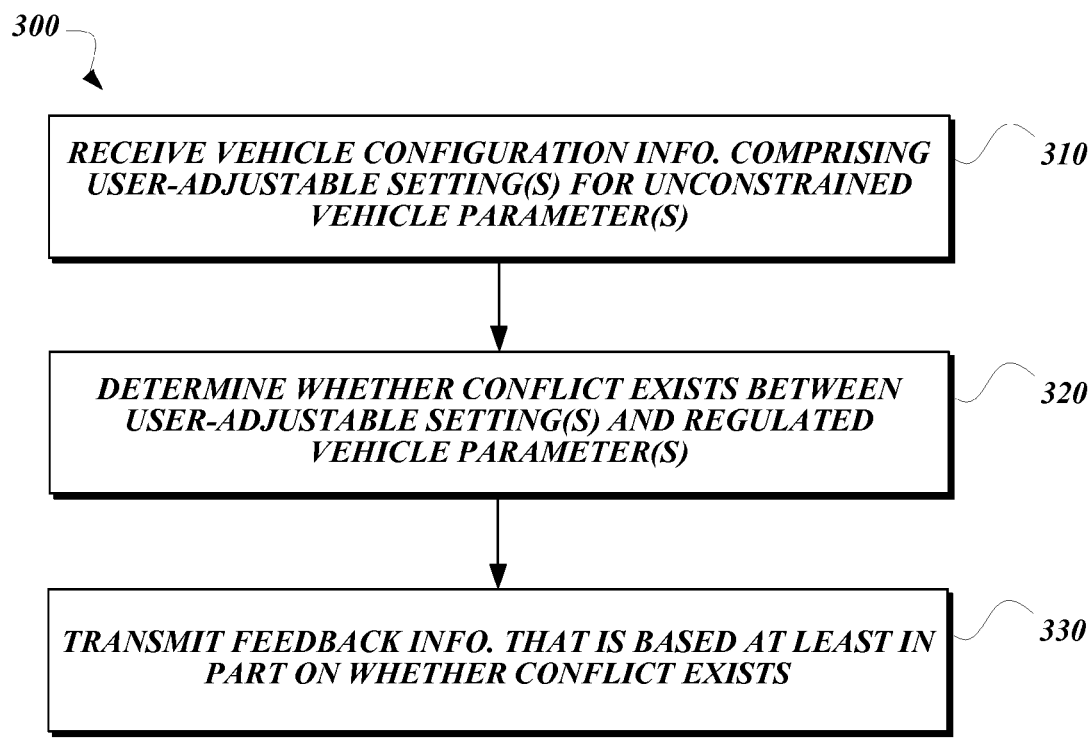
FIGS. 3-6B are flow charts that depict illustrative techniques for configuration of vehicle parameters in accordance with aspects of the disclosed subject matter.

FIG. 3 is a flow chart that depicts an illustrative technique 300 that a computing device (e.g., a server computer hosted by a vehicle manufacturer or retailer) can perform in a vehicle configuration process. At step 310, the computing device receives vehicle configuration information comprising one or more user-adjustable settings (e.g., reserve speed settings, driver reward bonus settings, etc.) for one or more unconstrained vehicle parameters. At step 320, the computing device determines whether a conflict exists between the user-adjustable settings and a regulated vehicle parameter (e.g., an effective VSL). At step 330, the computing device transmits feedback information that is based at least in part on whether a conflict exists. For example, if a user-adjustable driver reward bonus causes the effective VSL to exceed a constraint mandated by a GHG emission regulation, the computing device can transmit feedback information that alerts the user to an additional vehicle cost that may be due, options for removing or reducing the degree of the conflict, or the like. Feedback information can be received by a user device and used to present information or provide corresponding functionality in a user interface.

Figure 4:
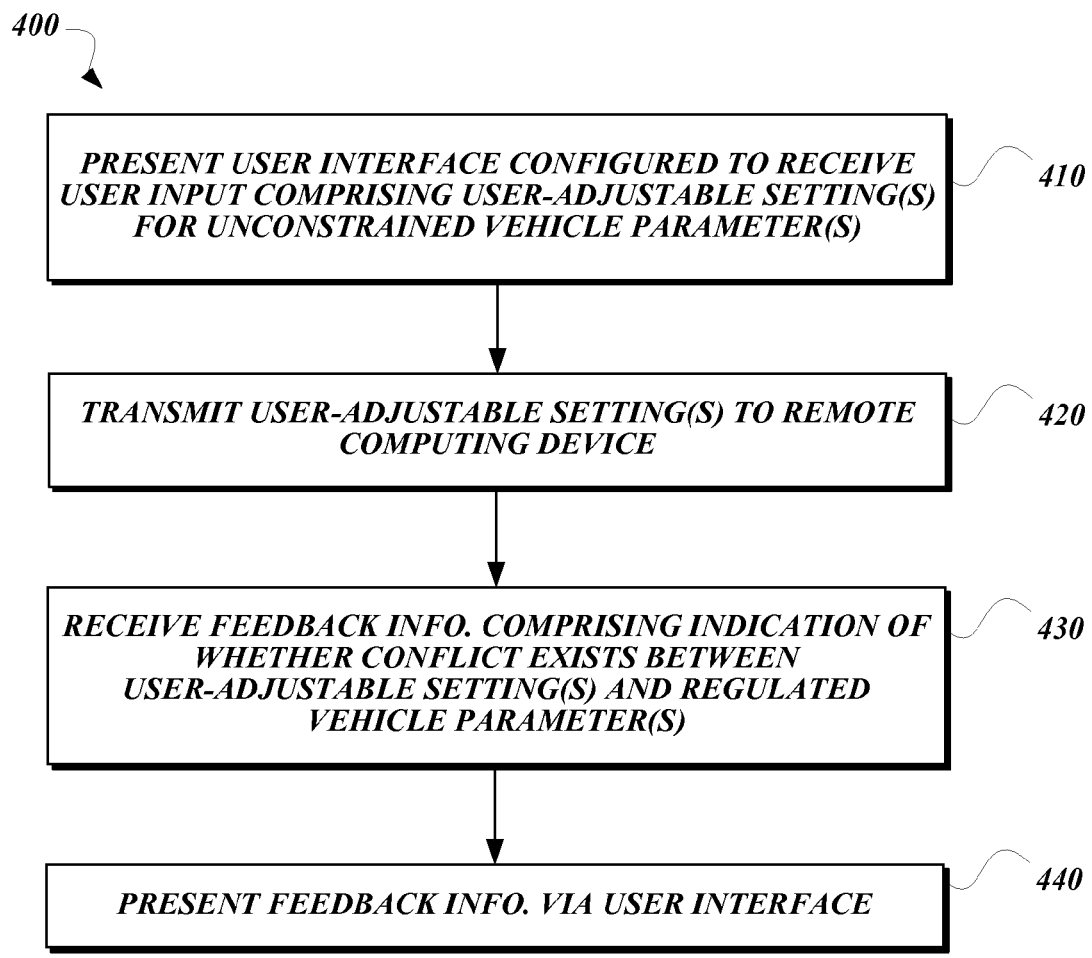

FIG. 4 is a flow chart that depicts an illustrative technique 400 that a computing device (e.g., a user device) can perform to provide feedback via a user interface in a vehicle configuration process. At step 410, the user device presents a user interface that is configured to receive user input comprising one or more user-adjustable settings (e.g., reserve speed settings, driver reward bonus settings, etc.) for one or more unconstrained vehicle parameters. At step 420, the user device transmits the user-adjustable settings to a remote computing device (e.g., a server computer hosted by a vehicle manufacturer or retailer). At step 430, the user device receives feedback information from the remote computing device. The feedback information includes an indication of whether a conflict exists between the user-adjustable settings and a regulated vehicle parameter (e.g., an effective VSL). At step 440, the user device presents the feedback information via the user interface.

Figure 5:
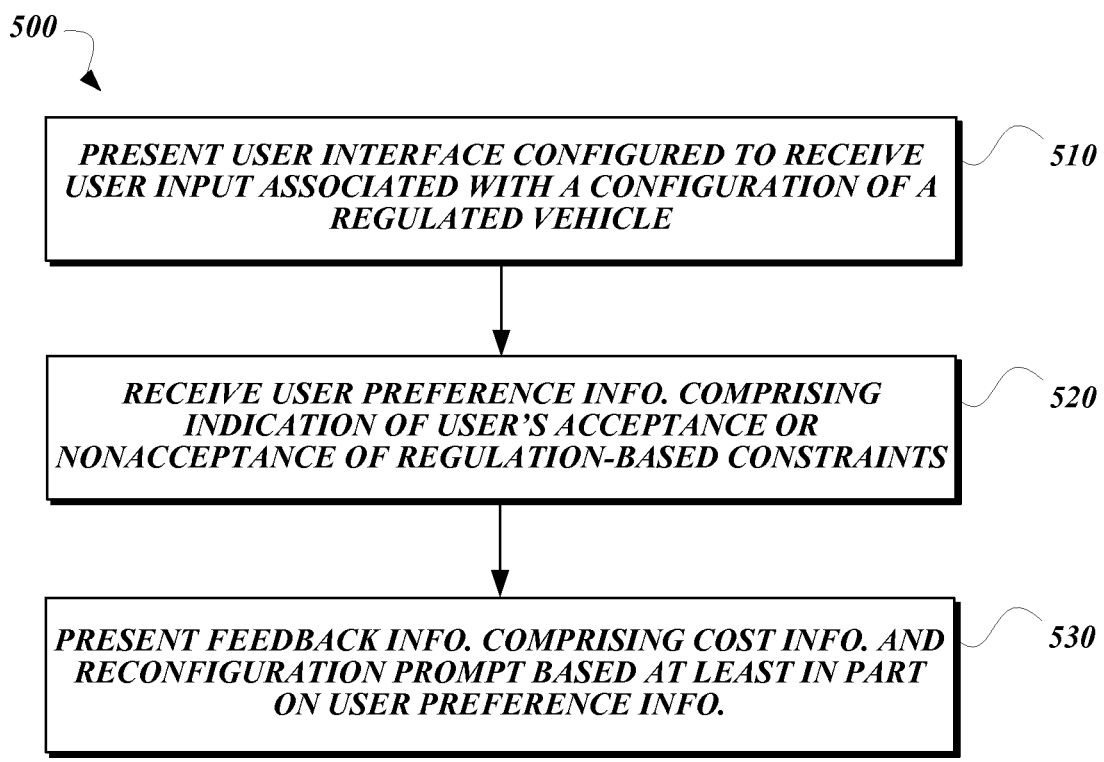

FIG. 5 is a flow chart that depicts another illustrative technique 500 that a computing device (e.g., a user device) can perform in a vehicle configuration process. At step 510, the user device presents a user interface that is configured to receive user input associated with a configuration of a regulated vehicle (e.g., a truck that is subject to GHG-emission regulations). At step 520, the user device receives user preference information that includes an indication of the user's acceptance or nonacceptance of regulation-based constraints on the configuration of the vehicle. At step 530, the user device presents feedback information via the user interface. The feedback information includes cost information and a reconfiguration prompt, and is based at least in part on the user preference information. For example, if the user preference information indicates the user's nonacceptance of regulation-based constraints, the cost information may indicate an additional vehicle option cost, and the reconfiguration prompt may provide the user with an opportunity to change the user preference information and accept the regulation-based constraints in order to reduce or remove the additional vehicle option cost.

Figure 6A:
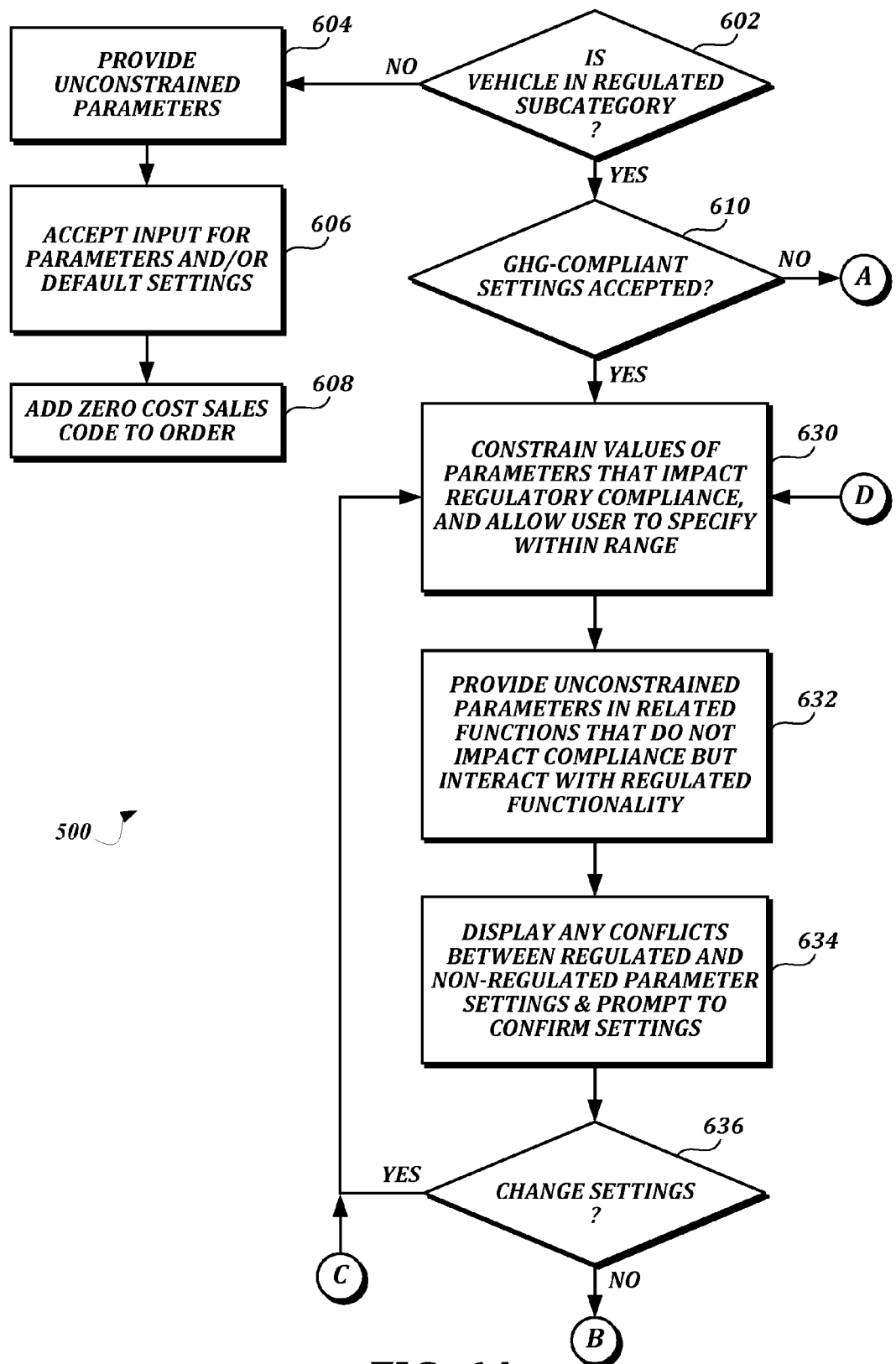
Figure 6B:
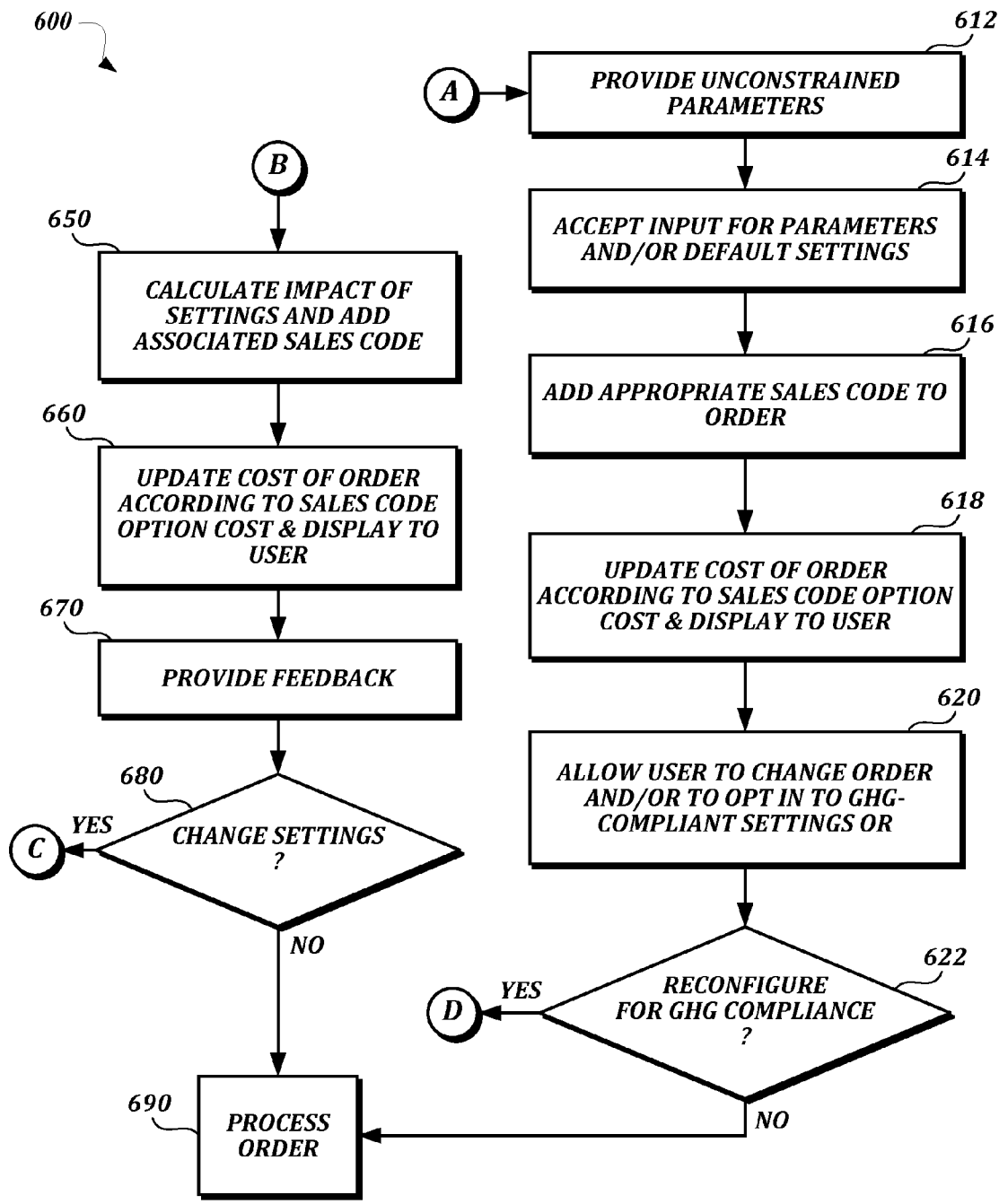

FIGS. 6A and 6B depict a flow chart of a detailed process 600 that can be performed by a computer system to generate a purchase order for a configured vehicle according to principles described herein. Referring to FIG. 6A, at step 602, the computer system determines whether a vehicle being configured is in a regulated category. This determination may be made, for example, after a user has selected a vehicle model or chassis for configuration. If the vehicle is not in a regulated category, unconstrained parameters are provided at step 604, and corresponding input or default settings are accepted at step 606. At step 608, a zero-cost sales code is added to the purchase order to indicate that no regulation-based cost has been added to the order.

Returning to step 602, if the vehicle is in a regulated category, the user is prompted at step 610 to accept or not accept recommended settings (e.g., GHG-compliant settings) for the vehicle. Referring to FIG. 6B, if the recommended settings are not accepted, unconstrained parameters are provided at step 612, and corresponding input or default settings are accepted at step 614. At step 616, a sales code is added to the purchase order to indicate the user's nonacceptance of the recommended settings, and at step 618 the cost of the order is increased and displayed to the user. At step 620, feedback is provided to prompt the user to change the configuration and opt in to the recommended settings or, if the settings provided by the user are already consistent with the recommended settings, to opt in to the recommended settings without otherwise changing the configuration. (See, for example, the feedback depicted in FIG. 2F.) At step 622, if the user chooses not to reconfigure, the order is processed at step 690. If the user chooses to reconfigure, the process proceeds to step 630, which is described below.

Referring again to FIG. 6A, at step 630, if recommended settings are accepted, values of parameters that impact regulatory compliance are constrained, and the user is allowed to specify a setting within a constrained range. The computer system may use soft constraints to encourage compliance (e.g., by adding cost or providing other behavior-guiding feedback while permitting values to exceed the constraints). Alternatively, the computer system may use hard constraints to ensure compliance by only allowing settings that do not violate the constraints. At step 632, unconstrained parameters are provided in related functions (e.g., driver reward speed bonuses) that do not directly impact compliance but may interact with regulated functionality (e.g., a vehicle speed limit). At step 634, any conflicts between regulated and unregulated parameters can be displayed and the user can be prompted to confirm the settings. At step 636, if the user elects to change the settings, the process returns to step 630. Otherwise, the process proceeds to step 650.

Referring to FIG. 6B, at step 650, the impact of the settings is calculated and an associated sales code is appended to the order. In at least one embodiment, the associated sales code is based on a calculated impact on overall OEM regulatory compliance. At step 660, the cost of the order is updated according to the option cost associated with the sales code, and the updated cost is displayed to the user. At step 670, feedback is provided based on results of previous steps. For example, the feedback can include display of recommended adjustments to settings that would reduce the cost of the vehicle if one or more user-adjustable settings have caused an option cost to be added to the cost of the vehicle. (See, for example, the feedback provided in FIGS. 2B and 2C.) Such a reduction in cost may reflect improved overall OEM regulatory compliance that may result from application of the recommended adjustments. At step 680, if the user elects to change the settings, the process returns to step 630. (See FIG. 6A.) Otherwise, the order is processed at step 690.

Extensions and Alternatives

Many alternatives to the user interfaces described herein are possible. In practice, the user interfaces described herein may be implemented as separate user interfaces or as different states of the same user interface, and the different states can be presented in response to different events, e.g., user input events. The user interfaces can be customized for different devices, input and output capabilities, and the like. For example, the user interfaces can be presented in different ways depending on display size, display orientation, whether the device is a mobile device, etc. The information and user interface elements shown in the user interfaces can be modified, supplemented, or replaced with other elements in various possible implementations. For example, although text boxes are shown in the user interface 200 depicted in FIGS. 2A-2F for ease of illustration, various combinations of graphical user interface elements including text boxes, sliders, drop-down menus, radio buttons, soft buttons, etc., or any other user interface elements, including hardware elements such as buttons, switches, scroll wheels, microphones, cameras, etc., may be used to accept user input in various forms. As another example, the user interface elements that are used in a particular implementation or configuration may depend on whether a device has particular input or output capabilities (e.g., a touchscreen). Information and user interface elements can be presented in different spatial, logical, and temporal arrangements in various possible implementations. For example, information or user interface elements depicted as being presented simultaneously on a single page or tab may instead be presented at different times, on different pages or tabs, etc. As another example, some information or user interface elements may be presented conditionally depending on previous input, user preferences, or the like.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Illustrative Devices and Operating Environments

Unless otherwise specified in the context of specific examples, described techniques and tools may be implemented by any suitable computing device or set of devices.

In any of the described examples, a data store may be used to store and manage data. A data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 7:
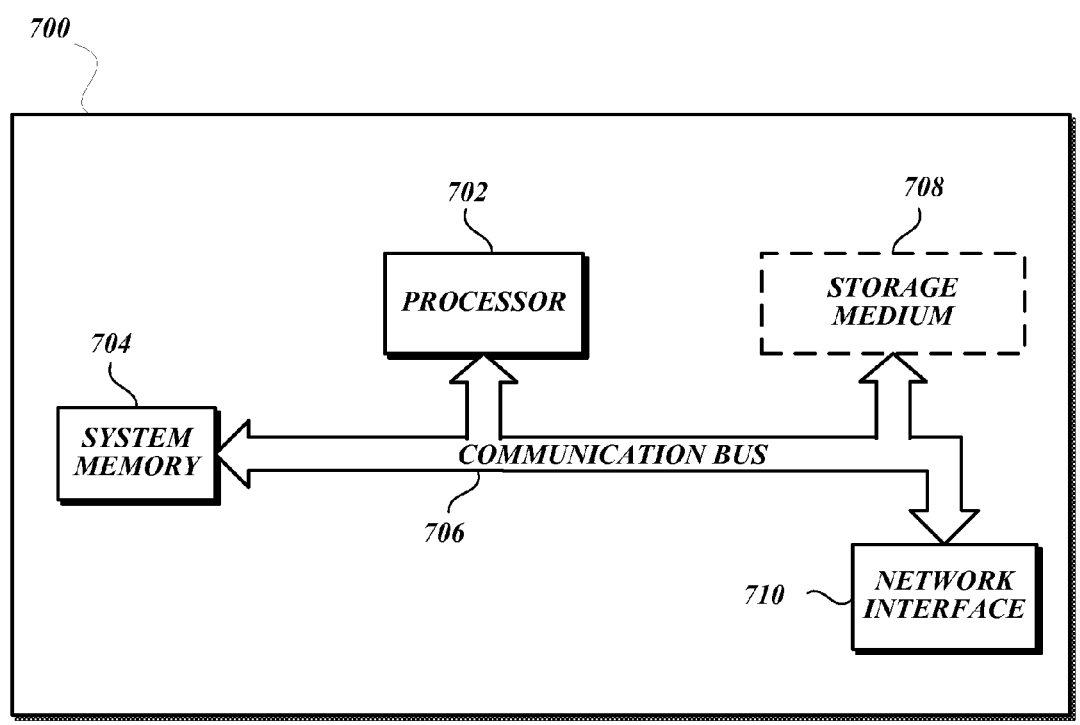
FIG. 7 is a block diagram that illustrates aspects of an exemplary computing device appropriate for use in accordance with aspects of the disclosed subject matter.

FIG. 7 is a block diagram that illustrates aspects of an illustrative computing device 700 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 700 includes at least one processor 702 and a system memory 704 connected by a communication bus 706. Depending on the exact configuration and type of device, the system memory 704 may be volatile or nonvolatile memory, such as read-only memory ("ROM"), random access memory ("RAM"), EEPROM, flash memory, or other memory technology. Those of ordinary skill in the art and others will recognize that system memory 704 typically stores data or program modules that are immediately accessible to or currently being operated on by the processor 702. In this regard, the processor 702 may serve as a computational center of the computing device 700 by supporting the execution of instructions.

As further illustrated in FIG. 7, the computing device 700 may include a network interface 710 comprising one or more components for communicating with other devices over a network. Embodiments of the present disclosure may access basic services that utilize the network interface 710 to perform communications using common network protocols. The network interface 710 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 7, the computing device 700 also includes a storage medium 708. However, services may be accessed using a computing device that does not include means for persisting data to a local storage medium. Therefore, the storage medium 708 depicted in FIG. 7 is optional. In any event, the storage medium 708 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 704 and storage medium 708 depicted in FIG. 7 are examples of computer-readable media.

For ease of illustration and because it is not important for an understanding of the claimed subject matter, FIG. 7 does not show some of the typical components of many computing devices. In this regard, the computing device 700 may include input devices, such as a keyboard, keypad, mouse, trackball, microphone, video camera, touchpad, touchscreen, electronic pen, stylus, or the like. Such input devices may be coupled to the computing device 700 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 700 (e.g., a client device), or can be integral components of the computing device 700. In some embodiments, multiple input devices may be combined into a single, multifunction input device (e.g., a video camera with an integrated microphone). The computing device 700 may also include output devices such as a display, speakers, printer, etc. The output devices may include video output devices such as a display or touchscreen. The output devices also may include audio output devices such as external speakers or earphones. The output devices can be separate from and communicatively coupled to the computing device 700, or can be integral components of the computing device 700. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A computer-implemented method of providing feedback via a user interface in a pre-sale or point-of-sale vehicle configuration process for a vehicle, the method comprising:
   receiving vehicle configuration information obtained via a user interface of a user device in a pre-sale or point-of-sale vehicle configuration process, wherein the vehicle configuration information comprises a user-adjustable setting for a first vehicle parameter;
   determining whether a conflict exists between the user-adjustable setting for the first vehicle parameter and a regulated vehicle parameter; and
   transmitting feedback information to the user device, wherein the feedback information is based at least in part on the determining step.

2. The method of claim 1, wherein the vehicle configuration information further comprises a user-adjustable setting for the regulated vehicle parameter, and wherein the regulated vehicle parameter is a constrained vehicle parameter.

3. The method of claim 1, wherein the vehicle configuration information further comprises an indication of whether the vehicle is in a regulated category.

4. The method of claim 1, wherein the vehicle configuration information further comprises an indication of whether regulatory constraints of vehicle parameters are accepted by a user.

5. The method of claim 1, wherein the feedback information comprises a description of one or more conflicts between the user-adjustable setting for the first vehicle parameter and the regulated vehicle parameter.

6. The method of claim 1, wherein the feedback information comprises suggested settings to reduce a cost of the vehicle.

7. The method of claim 6, wherein the suggested settings to reduce the cost of the vehicle, if accepted, remove or reduce the degree of one or more conflicts between the user-adjustable setting for the first vehicle parameter and the regulated vehicle parameter.

8. The method of claim 1, further comprising receiving updated vehicle configuration information comprising an updated user-adjustable setting for the first vehicle parameter.

9. The method of claim 1, further comprising processing an order for the vehicle based on the vehicle configuration information.

10. The method of claim 1, wherein the regulated vehicle parameter is a vehicle speed limit.

11. The method of claim 1, wherein the regulated vehicle parameter is associated with greenhouse gas emissions.

12. The method of claim 2, wherein the constrained parameter is an effective vehicle speed limit.

13. The method of claim 12, wherein the effective vehicle speed limit is mandated by a greenhouse gas emission regulation.

14. The method of claim 12, wherein the user-adjustable setting for the first vehicle parameter comprises a driver reward speed bonus, a reserve speed, or a cruise control offset.

15. The method of claim 1, wherein the regulated vehicle parameter is an engine idle parameter.

16. A computer-implemented method of providing feedback via a user interface in a pre-sale or point-of-sale vehicle configuration process for a vehicle, the method comprising:
by a first computing device, presenting a user interface to a user, wherein the user interface is configured to receive user input comprising a user-adjustable setting for a first vehicle parameter in a pre-sale or point-of-sale vehicle configuration process;
by the first computing device, transmitting the user-adjustable setting for the first vehicle parameter to a remote computing device;
by the first computing device, receiving feedback information from the remote computing device, wherein the feedback information comprises an indication of whether a conflict exists between the user-adjustable setting for the first vehicle parameter and a regulated vehicle parameter; and
by the first computing device, presenting the feedback information via the user interface.

17. The method of claim 16, wherein the user interface is further configured to obtain user input comprising a user-adjustable setting for the regulated vehicle parameter, and wherein the regulated vehicle parameter is a constrained vehicle parameter.

18. The method of claim 16, wherein the regulated vehicle parameter is a vehicle speed limit.

19. The method of claim 16, wherein the feedback information further comprises cost information.

20. The method of claim 16, wherein the feedback information further comprises a reconfiguration prompt.

21. The method of claim 16, further comprising transmitting an updated user-adjustable setting for the first vehicle parameter.

22. One or more computer-readable storage media having stored thereon computer-executable instructions configured to cause one or more computing devices to:
present a user interface configured to receive user input associated with a configuration of a regulated vehicle;
receive user preference information via the user interface, wherein the user preference information comprises an indication of a user's acceptance or nonacceptance of regulation-based constraints on vehicle parameters; and
present feedback information via the user interface, wherein the feedback information comprises cost information and a reconfiguration prompt, wherein the cost information and the reconfiguration prompt are based at least in part on the user preference information.

23. The computer-readable storage media of claim 22, wherein the computer-executable instructions are further configured to cause the one or more computing devices to identify a conflict with a regulated vehicle parameter.

24. The computer-readable storage media of claim 23, wherein the regulated vehicle parameter is a vehicle speed limit.

25. A computer-implemented method of providing feedback via a user interface in a vehicle configuration process for a vehicle, the method comprising:
receiving vehicle configuration information obtained via a user interface of a user device, wherein the vehicle configuration information comprises a user-adjustable setting for a first vehicle parameter, wherein the first vehicle parameter is a vehicle performance parameter or physical configuration parameter;
determining whether a conflict exists between the user-adjustable setting for the first vehicle parameter and a regulated vehicle parameter; and
transmitting feedback information to the user device, wherein the feedback information is based at least in part on the determining step.

26. The method of claim 25, wherein the first vehicle parameter is a vehicle performance parameter and wherein the regulated parameter is selected from the group consisting of: vehicle speed parameter and engine idle parameter.

27. The method of claim 25, wherein the first vehicle parameter is a physical configuration parameter and wherein the regulated parameter is selected from the group consisting of: axle spacing, tires per axle, and tire size.

* * * * *